Nov. 18, 1947.  T. W. JOHNSON  2,431,046
CULTIVATOR
Filed March 24, 1944   2 Sheets-Sheet 1

INVENTOR
THEODORE W. JOHNSON
ATTORNEYS

Nov. 18, 1947. T. W. JOHNSON 2,431,046
CULTIVATOR
Filed March 24, 1944 2 Sheets-Sheet 2

INVENTOR.
THEODORE W. JOHNSON
BY
ATTORNEYS

Patented Nov. 18, 1947

2,431,046

UNITED STATES PATENT OFFICE 2,431,046

CULTIVATOR

Theodore W. Johnson, Moline, Ill., assignor to Deere & Company, Moline, Ill., a corporation of Illinois Application March 24, 1944, Serial No. 527,979

7 Claims. (Cl. 97—47)

The present invention relates generally to cultivators and more particularly to cultivators of the type that are adapted to be mounted directly on a farm tractor.

The object and general nature of the present invention is the provision of a new and improved rear cultivator rig construction of the type that is adapted to be mounted on the rear of a tractor and to dispose tools rearwardly of the wheels of the tractor. More particularly, it is a feature of this invention to provide an improved mounting for the rear cultivator tools, including parallel link mechanism arranged so that the rear tools may swing up and down relative to the tractor but without changing their angular position. More specifically, it is a feature of this invention to provide a parallel link arrangement for supporting the rear cultivator tools and so constructed and arranged that the tools are held to their work in a firm and positive manner yet are free for generally vertical floating movement relative to the tractor.

These and other objects and advantages of the present invention will be apparent to those skilled in the art after a consideration of the following detailed description, taken in conjunction with the accompanying drawings illustrating one preferred embodiment of the present invention.

Figure 1:
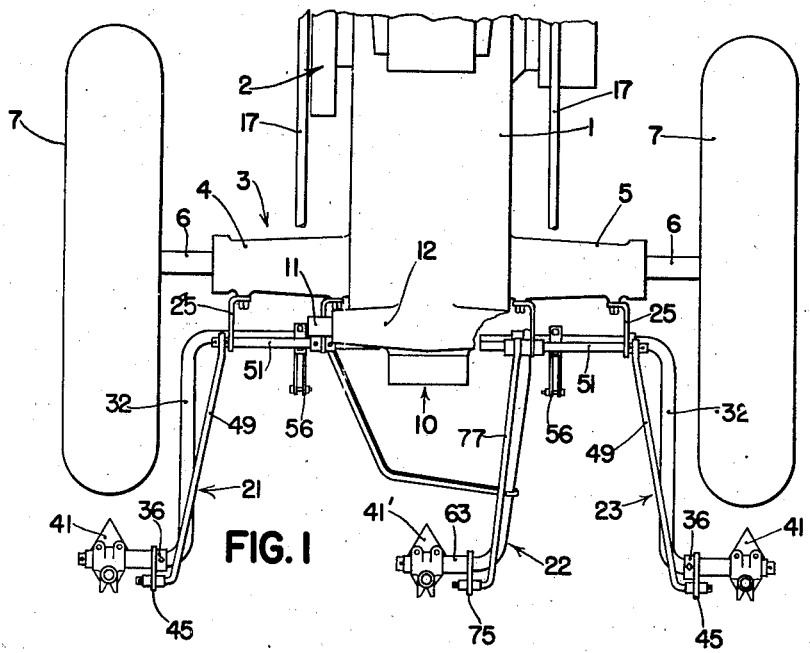
Figure 1 is a partial plan view of a tractor mounted cultivator in which the principles of the present invention have been incorporated.
Figure 2:
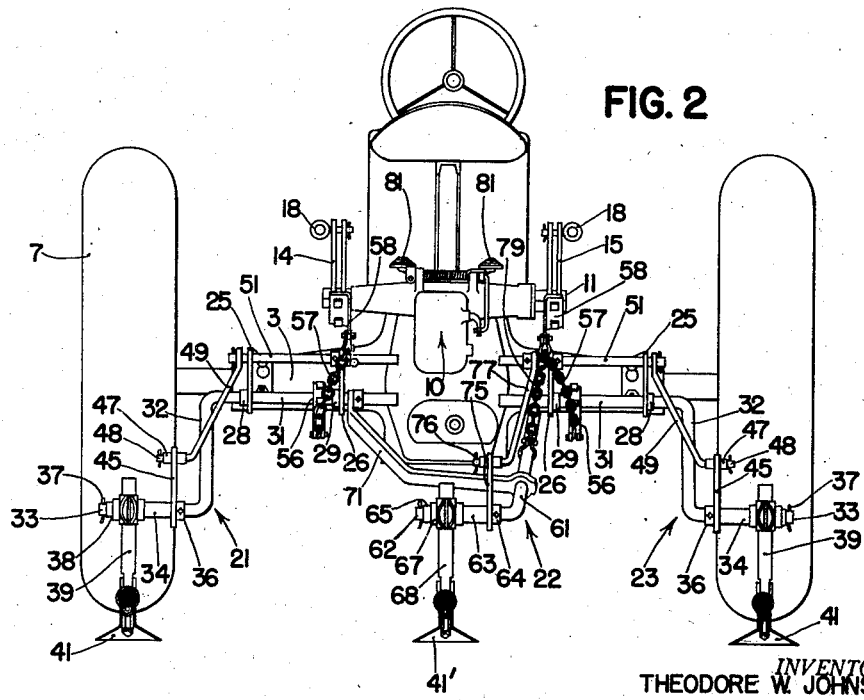
Figure 2 is a rear view of the cultivator shown in Figure 1.
Figure 3:
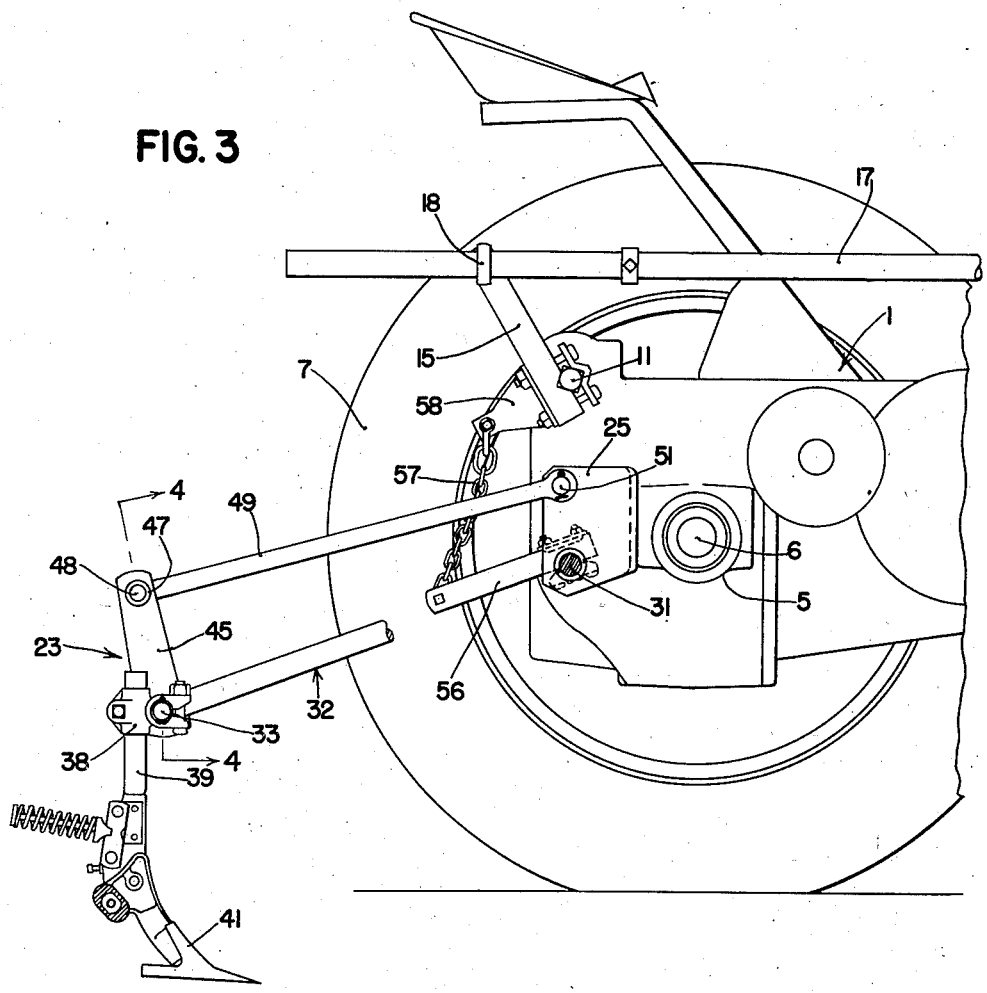
Figure 3 is a side view of the cultivator shown in Figure 1.
Figure 4:
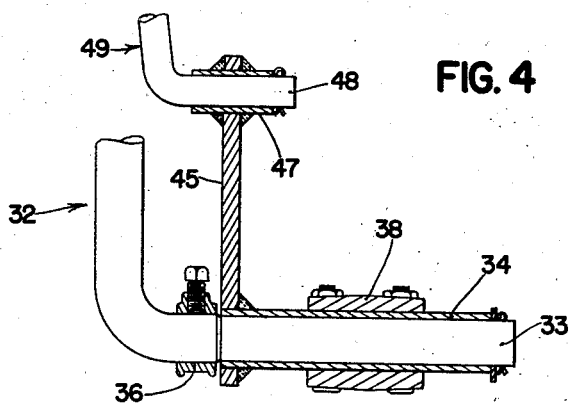
Figure 4 is a section taken generally along the line 4—4 of Figure 3.

The tractor on which the cultivator is mounted is of more or less conventional construction, embodying a frame section 1 which supports or forms a part of the housing of the motor 2 and which at its rear end carries or is formed with a rear axle section 3 which comprises laterally outwardly extending rear axle extensions or quills 4 and 5. In the latter parts of the tractor, drive axles 6 are mounted for rotation, the outer end of each receiving a rear tractor wheel 7. The tractor is provided with a power lift mechanism indicated in its entirety by the reference numeral 10 and which includes a transverse rockshaft 11 supported in a power lift housing 12. Secured to the outer ends of the rockshaft 11 is a pair of arms 14 and 15 each receiving the rear end of a cultivator lift pipe 17 that at its forward end connects to the associated front tools (not shown). Preferably, connection between the lift arms 14 and 15 and the cultivator lift pipes 17 is effected by means of swivels 18 (Figure 2).

The present invention is more particularly concerned with the construction and arrangement of the rear rigs. As best shown in Figure 2, the rear cultivator rigs include a left hand rig 21, a center rig 22, and a right hand rig 23. The right and left hand rigs 21 and 23 are substantially identical, except that certain of the parts are right hand while other parts are left hand. Referring first to the left hand rig construction 21, the left hand tractor rear axle quill 4 is provided with suitable means for receiving and supporting a pair of brackets 25 and 26 in laterally spaced relation. The laterally outer bracket 25 is formed with a lower apertured section 28 forming a bearing for the associated rig beam, and likewise the lower portion of the inner bracket 26 is formed with an apertured bearing portion 29. Mounted for rocking movement in the aforesaid bearing sections 28 and 29 is the laterally inturned end 31 of the left hand rig beam 32. The rear or lower end of the rig beam 32 is formed with a laterally outwardly directed section 33 disposed substantially directly rearwardly of the left hand tractor wheel 7. A sleeve 34 is mounted for rocking movement on the laterally outwardly directed rig beam section 33 and is held against lateral displacement thereon by any suitable means, such as a collar 36 and a cotter pin 37. By means of a shank clamp 38, a cultivator shank 39 is secured rigidly to the sleeve 34, the shank 39 carrying a cultivator shovel 41.

An arm 45 is rigidly secured, as by welding, at its lower end to the inner end of the sleeve 34. The upper end of the arm 45 is provided with a bearing or bushing 47 in which the laterally outturned end 48 of the bracing link 49 is disposed. The forward end of the link 49 is pivoted to the outer end of a cross bar 51 which is supported in suitable apertures formed in the upper sections of the rig brackets 25 and 26. Collars and/or cotter pins are employed for holding the shaft 51 in place in the brackets 25 and 26 and the forward end of the link 49 in place on the transverse shaft or bar 51. The bracing link 49 extends generally in parallelism with respect to the rig beam 32 so that when the tool 41 is moved upwardly or downwardly, the action of the link 49 and the rig beam 32 is to maintain the angular position of the tool 41 and the shank 39 that supports it substantially unchanged. This arrangement produces a very steady running tool, particularly where, as shown, the arm 45 is substantially perpendicular to the link 49.

For raising the tool 41 into a transport position by the operation of the power lift unit 10, an arm 56 is secured to the laterally inwardly directed portion 31 of the rig beam 32 and at its outer end receives the lower end of a chain 57, the upper end of which is connected to an arm 58 which forms a part of the clamping means securing the lift arm 14 in place on the rockshaft 11. The arm 58 may, of course, be fastened directly to the end of the power lift rockshaft 11 by any suitable means entirely independent of the connection of the lift arm 14 although the latter is the preferred construction.

The right hand rig beam construction 23 is substantially the same as just described and, in fact, many of the parts are substantially identical. For this reason, therefore, a further description is believed to be unnecessary and the same reference numerals employed in describing the left hand rig construction 21 have been used to indicate the corresponding parts in the right hand rear rig construction 23.

The center rig construction 22 includes a rig beam 61 having a laterally directed section 62 at its rear end on which a tool carrying sleeve 63 is rockably mounted. The sleeve is secured in place by a collar 64, which bears against one side of an arm 75 that is fixed to the sleeve 63, and a cotter pin which bears against the other end 65 of the sleeve 63. The sleeve 63 carries a shank clamp 67 and the latter, in turn, receives the shank 68 that supports the center tool 41'. The forward end of the rig beam 61 is flattened and apertured and is pivotally mounted on the laterally inturned end portion 31 of the right hand rig beam 32. The center rig beam 22 also includes a brace member 71 which extends forwardly in diverging relation and is apertured and received on the inner end of the left hand rig beam section 31, whereby the center rig 22 may be swung upwardly or downwardly as desired. A generally upwardly extending arm 75 is secured as by welding or the like to one end of the tool carrying sleeve 63 and at its upper end receives a bushing in which the laterally turned end 76 of a brace 77 is disposed. The front end of the brace 77 is apertured and is received by the laterally inner end of the right hand cross shaft or bar 51. A chain 79 is connected at its lower end directly to the rig beam 61 and at its upper end to the outer end of the arm 58 to which the chain 57 is connected, as described above. Like the left and right hand rig constructions, the brace 77 is disposed in substantially parallel relation with respect to the lower rig beam 61 and hence when the center rig rises and falls, as in passing over uneven ground, the angular position of the shank 68 is not varied.

The chains 57 and 79 are normally connected with such slack that the tools are allowed considerable vertical movement relative to the tractor, but when the power lift 11 is actuated, as by stepping on one of the pedals 81 thereof, the rockshaft 11 is rocked in a direction to swing the arms 58 upwardly, thus acting through the chains 57 and 79 to raise not only the outer rigs but also the inner rigs.

While I have shown and described above, the preferred construction in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent, is:

1. In a tractor cultivator adapted to be attached to a tractor, bracket means adapted to be attached to the rear portion of the tractor and having apertured sections, a rear rig beam rockably mounted at its forward end in said apertured bracket sections and having at its rear end a laterally outwardly turned portion, a sleeve mounted on said laterally outturned rig beam portion, means on said rig beam portion to hold said sleeve against lateral displacement relative thereto, an upwardly extending arm fixed to said sleeve adjacent one end thereof, a ground working tool, means adjustably fixing said tool to said sleeve in different lateral positions along the latter relative to said arm, a link connected pivotally to the upper end of said arm, and means pivotally connecting the forward end of said link with said bracket means, said link extending generally in parallelism with respect to the main portion of said rig beam.

2. In a tractor mounted cultivator, a rig beam having a laterally outturned portion at its rear end, means pivotally connecting the forward end of said rig beam with the tractor for generally vertical swinging movement and to position said laterally outturned end generally rearwardly of the tractor wheel, a sleeve mounted for rocking movement on said laterally outturned end, means on said laterally outturned end for holding said sleeve against lateral displacement thereon, a ground working tool, means adjustably fixing said tool to said sleeve in different lateral positions, an arm fixed to said sleeve, and a link connecting said arm with the tractor.

3. In a tractor mounted cultivator, a rig beam having a laterally outturned portion at its rear end, means pivotally connecting the forward end of said rig beam with the tractor for generally vertical swinging movement and to position said laterally outturned end generally rearwardly of the tractor wheel, a sleeve mounted for rocking movement on said laterally outturned end, a tool fixed to said sleeve, an arm fixed to said sleeve adjacent the inner end thereof and extending generally upwardly, a link extending generally parallel with said rig beam pivotally connected at its rear end to the upper end of said arm and at its forward end to the tractor, the forward end of said rig beam having a laterally inturned portion, bracket means mounted on the tractor and including apertured sections receiving said laterally inturned rig beam portion, a transverse bar carried by said bracket means, means pivotally connecting the forward end of said link with the outer end of said transverse bar, a center rig beam pivotally connected at its forward end to the inner end of said laterally inturned rig beam portion, said center rig beam having a laterally directed section, a sleeve mounted on said section for rocking movement relative thereto, a tool fixed to said second sleeve, an arm fixed to said second sleeve, and a link pivotally connected to the upper end of said arm and to the inner portion of said transverse bar, said links extending generally in parallelism with respect to said rig beams.

4. In a tractor mounted cultivator adapted to be mounted on a tractor having a rear axle with right and left rear axle extensions, a pair of laterally spaced brackets for each of said rear axle extensions, each bracket of each pair having upper and lower apertures therein, a pair of rig beams, each including a laterally outwardly extending rear end disposed substantially directly rearwardly of the rear tractor wheels and a laterally inwardly extending front end of sufficient length to span the associated pair of laterally spaced brackets and pivotally received in the lower apertures therein, a transverse member carried in the upper apertures of each of said pairs of brackets, a tool carrying member rockably mounted on each of said laterally outwardly turned ends of the rig beams, an arm fixed to each of said tool carrying members, a pair of links, each having a laterally outturned end pivotally disposed in the upper end of the associated arm, and means for connecting the forward end of each of said links to the outer end of the associated transverse member whereby said links are pivotally connected with the rear of the tractor and disposed generally parallel with respect to the associated rig beams so that, as the latter move generally upwardly and downwardly relative to the tractor, the angular position of the tools connected to each tool carrying member remains substantially constant.

5. The invention set forth in claim 4, further characterized by a center rig beam including laterally spaced forward sections pivotally mounted on the laterally inturned portions of said outer rig beams, said center rig beam also including a laterally directed rear end section, a tool carrying member rockably mounted on said last mentioned end section, an arm fixed to said tool carrying member, and a link pivotally connected to the upper end of said arm and to the inner end of one of said transverse members and disposed generally in parallelism with respect to said center rig beam.

6. In a tractor mounted cultivator adapted to be mounted on a tractor having a rear axle with right and left rear axle extensions and raising and lowering means carried adjacent the rear of the tractor, a pair of laterally spaced brackets for each of said rear axle extensions, each bracket of each pair having upper and lower apertures therein, a pair of rig beams, each including a laterally outwardly extending rear end and a laterally inwardly extending front end of sufficient length to span the associated pair of laterally spaced brackets and pivotally received in the lower apertures therein, a transverse member carried in the upper apertures of each of said pairs of brackets, a tool carrying member rockably mounted on each of said laterally outwardly turned ends of the rig beams, an arm fixed to each of said tool carrying members, a pair of links, each having a laterally outturned end pivotally disposed in the upper end of the associated arm, means for connecting the forward end of each of said links to the outer end of the associated transverse member whereby said links are pivotally connected with the rear of the tractor and disposed generally parallel with respect to the associated rig beams so that, as the latter move generally upwardly and downwardly relative to the tractor, the angular position of the tools connected to each tool carrying member remains substantially constant, an arm fixed to the laterally inwardly extending end of each of said rig beams, and means connecting said arms with said tractor raising and lowering means.

7. In a tractor mounted cultivator adapted to be mounted on a tractor having a rear axle with right and left rear axle extensions, a pair of laterally spaced brackets for each of said rear axle extensions, each bracket of each pair having upper and lower apertures therein, a pair of rig beams, each including a laterally outwardly extending rear end and a laterally inwardly extending front end of sufficient length to span the associated pair of laterally spaced brackets and pivotally received in the lower apertures therein, a tool carrying member rockably mounted on each of said laterally outwardly turned ends of the rig beams, an arm fixed to each of said tool carrying members, and means connecting the upper ends of said arms with the tractor, the connecting means for each arm comprising a forward transverse section carried in the upper apertures of each of said pairs of brackets, and a rearwardly extending section pivotally connected to the upper end of the associated arm and disposed generally parallel with respect to the associated rig beam.

THEODORE W. JOHNSON.

REFERENCES CITED

The following references are of record in the file of this patent:

UNITED STATES PATENTS

| Number | Name | Date |
| --- | --- | --- |
| 2,264,575 | Knapp, et al. | Dec. 2, 1941 |
| 2,336,062 | Brown et al. | Dec. 7, 1943 |
| 2,174,808 | Tuft | Oct. 3, 1939 |
| 2,332,720 | Hipple | Oct. 26, 1943 |
| 2,129,746 | Smith | Sept. 13, 1938 |